Patented Oct. 14, 1924.

1,511,754

UNITED STATES PATENT OFFICE.

WILHELM CONNSTEIN, OF BERLIN, AND KARL LÜDECKE, OF WILMERSDORF, NEAR BERLIN, GERMANY.

PROCESS FOR MANUFACTURING OF PROPANTRIOL FROM SUGAR.

No Drawing.    Application filed August 13, 1919. Serial No. 317,324.

(GRANTED UNDER THE PROVISIONS OF THE ACT OF MARCH 3, 1921, 41 STAT. L., 1313.)

*To all whom it may concern:*

Be it known that we, WILHELM CONNSTEIN, chemist, a citizen of Prussia, and residing at Fasanenstreet 27, Berlin, Germany, and KARL LÜDECKE, chemist, a citizen of Prussia, and residing at Kaiser Allee 156, Wilmersdorf, near Berlin, Germany, have invented a new and useful Improvement in Processes for Manufacturing of Propantriol from Sugar (for which we have filed the following applications in foreign countries: Germany, 298,593, filed April 12, 1915; Germany, 298,595, filed April 22, 1916; Germany, 298,594, filed April 22, 1916; Germany, 298,596, filed May 19, 1916; all patents are not yet published, kept secret; Germany, Ser. Nr. V. 13,860, filed June 18, 1917, are not yet granted; Hungary, Ser. Nr. 2,682, filed July 22, 1916; Hungary, Ser. Nr. 2,684, filed July 27, 1916; Hungary, Ser. Nr. 2,685, filed July 27, 1916; Hungary, Ser. Nr. 2,686, filed July 27, 1916; Hungary, Ser. Nr. 10,407/18, filed July 13, 1918, all are not yet granted; Austria, Ser. Nr. A. 3,307/16, filed July 20, 1916; Austria, Ser. Nr. 61,497, filed July 5, 1918, all not yet granted; all these patents and applications have been filed by the Vereinigte Chemische Werke Akt.-Ges. with affiants' knowledge and consent); and we do hereby declare the following to be a full, clear, and exact description of the same.

The present process refers to the manufacture of propantriol from sugar by fermentation. The formation of propantriol from sugar by fermentation has been already known. The proportion of propantriol obtained according to the hitherto known processes, is however very small, about 1-3% from the used sugar, for which reason the industrial or commercial manufacture of propantriol from sugar has been until now unpracticable. The object of the present invention is to improve the manufacture of propantriol from sugar by means of yeasts.

The present process consists in causing sugar to ferment in alkaline solution, so that the formation of alcohol is restricted and the formation of propantriol is increased above the proportion obtained in the normal fermentation, i. e., above 3% of the sugar. If one causes, as hitherto usual, sugar or starch to ferment in neutral or acid solution only small amounts of propantriol are formed, whereas acids are formed which injure the isolation of the small amounts of propantriol obtained. The formation of acids are completely suppressed or essentially diminished by the fermentation in alkaline medium.

The present process is carried out by the addition of alkaline reacting substances to the sugar solution to be fermented. Inorganic as well as organic substances of this kind may be used. It is suitable to use only substances which are not poisonous with reference to yeast.

Suitable alkaline reacting substances are for instance: ammonium phosphate, ammonium carbonate, sodium phosphate, sodium carbonate, sodium bicarbonate, sodium sulphite, sodium acetate, amine salts. One may use a single compound or a mixture of several ones. The amounts of the alkaline compounds to be used may vary.

One may add to the liquor to be fermented nutrients for the yeast.

In order to accelerate the process and increase the formation of propantriol one may add catalysts, for instance manganese sulphate, iron sulphate, magnesium sulphate and such like.

Suitable sugars are for instance: grape-sugar, glucose, fructose, inverted saccharose, maltose; saccharified starch and such like.

As yeast one may use the ordinary commercial yeast, especially pressed yeast, one may however also use cultivated pure yeast and also several races of yeast.

The isolation or separation of the propantriol may be carried out by, if desired, decolorizing the fermented liquor, concentrating the liquor and subjecting the concentrated mass to a distillation process or extracting the propantriol by means of suitable organic solvents or by any other known method, for instance by treating the original solution with inorganic salts like calciumbarium chloride, ferrous sulphate and so on. One may also separate the yeast from the fermented liquor by filtration, precipitate injuring by-products by means of lime, iron compounds or magnesia and concentrate the purified liquor, whereupon the further steps for isolating propantriol are carried out.

Example I.

200 grams sugar and 140 grams secondary sodium phosphate are dissolved in 2 litres water to which solution 50 grams commercial yeast, containing preferably lactic-acid bacterias, are added. The mixture is allowed to ferment at about 30–35° centigrade during about 40–80 hours according to the quantity and the character of the yeast employed, until the sugar has practically disappeared. Then the mixture is boiled if desired with decolorizing carbon, filtrated, and concentrated to syrupy consistency. The propantriol may be extracted by means of alcohol. After the vaporization of the alcohol one obtains a residue of propantriol, the amount of which is about 14% of the used sugar.

One may use as sugar technical sacchariferous liquids, as for instance, syrups or molasses, which one may deprive, if necessary, before the fermentation, totally or partly, from injuring substances in the known manner. One dissolves the alkaline compounds in these liquids. The addition of the alkaline compounds or the yeast may be carried out successively or all at once.

Example II.

200 grams sugar and 10 grams ammonium carbonate are dissolved in 1.5 litres water and 20 grams yeast are added. The further treatment is according to Example I. One obtains about 10% propantriol of the used sugar.

Example III.

400 grams sugar, 80 grams sodium bicarbonate, 60 grams yeast and 2 grams manganese sulphate with 3.5 litres water are caused to be fermented. The mixture is treated according to Example I. One obtains about 12% propantriol of the used sugar.

Example IV.

500 grams sugar, 20 grams sodium carbonate, 80 grams yeast and 4 litres water is caused to be fermented at 30° centigrade. One obtains after the treatment according to Example I 12% propantriol of the used sugar.

Although all alkaline substances which are not poisonous to yeast may be used the alkaline sulphites have been found especially suitable. When used in certain large proportions the alkaline sulphites produce an especially high yield of propantriol and remarkable quantities of acetaldehyde. According to our general experience the yield of propantriol seems to vary proportionally to the quantities of the employed alkaline sulphites, i. e., the more of the latter is taken the higher is the yield of propantriol.

Example V.

1 kilogram saccharose, 100 grams normal sodium sulphite and 100 grams yeast are added to 5.6 litres water, the mixture is allowed to be fermented at from 30° to 36° centigrade. The fermentation is continued until the sugar has disappeared or has practically disappeared. The formed alcohol and aldehyde are distilled off, the remaining liquid is boiled with decolorizing carbon, filtered and concentrated. The residue is extracted with alcohol. After the vaporization of alcohol and aldehyde one obtains about 14.3% propantriol, whereas the amount of alcohol and aldehyde, distilled off before the concentration is about 39%. If one uses 120 grams sulphite in the present example one obtains about 16% propantriol and about 30% alcohol mixture, if one uses 250 grams sulphite one obtains about 23.5% propantriol and about 24% alcohol mixture and so on. It is to be noticed that the fermentation depends besides to a certain extent upon the quality and race as well as from the power of activity of the yeast employed, i. e., all these circumstances may exercise an influence on the rapidity of the reaction and on the yield of the final products.

In the place of sulphites one may use compounds which allow sulphites to form in the process, for instance a mixture of bisulphites and sodium carbonate.

It has proved suitable to use besides the sulphites in addition to them salts, which have a reducing action as for instance hydrosulphites, hyposulphites, sulphoxylates, preferably in small portions from 0.25 to 1% of the sugar.

It has been found that it is not necessary for each fermentation with alkaline substances to use fresh yeast, but that one may use yeast which has been already employed for the manufacture of propantriol in alkaline reaction, whereby it is preferable to subject the yeast to a purifying fermentation.

Example VI.

1 kilogram of saccharose, 12% sodium sulphite, 1% sodium hyposulphite, 6.6 litres water are mixed and 10% yeast are added. One obtains about 14.3% propantriol from the sugar. The yeast is separated from the liquid, washed with water and digested with diluted acid, in which treatment yeast nutrients may added. The acid reaction is gradually neutralized in order to acclimatize the yeast to the alkaline medium. Then one uses the yeast for fermenting fresh amounts of sugar with sulphites as alkaline compounds and if desired with addition of hyposulphites. One obtains about 15.8% propantriol. After the yeast has been separated and subjected to a repeated purifying fermentation one obtains by a third use with sulphite and hyposulphite also about 16% propantriol and so on.

The amount of propantriol formed by the present invention according to the various modifications described above is increased proportionally to the strength of the alkaline reaction or the amount of the alkaline reacting substances, provided that the quantity and character of the alkaline substances used is not detrimental to the yeast, but the said increase goes only to a certain point varying according to the nature of the added substance. One may add without injuring the formation of propantriol further amounts of alkaline reacting substances by a simultaneous use of neutral salts of magnesium. The use of the said salts has been found especially effective for alkaline sulphites. Generally the formation of propantriol proceeds slowly with an addition of more than about 70 per cent as much sulphites as sugar, whereas in the simultaneous use of neutral salts of magnesium even higher amounts of sulphites may be added. Especially suitable is magnesium sulphate or magnesium chloride, but one may also use neutral magnesium salts of organic acids. Of course it is a condition that the salts are not poisonous with reference to yeast. A special advantage of the use of neutral magnesium salts is an acceleration of the fermentation.

*Example VII.*

1 kilogram sugar, 500 grams sodium sulphite (without crystallization water) and 250 grams magnesium sulphate are dissolved in 8 litres water and fermented with 100 grams yeast. Output of alcohol mixture about 13% and of propantriol: about 33% of the used sugar.

*Example VIII.*

1 kilogram sugar, 1 kilogram magnesium chloride and 750 grams sodium bicarbonate are dissolved in 7 litres water and mixed with 150 grams yeast. The mixture is allowed to stand at 30° centigrade. After about 2 days the fermentation will be finished. Output: about 23% alcohol, about 20% propantriol of the used sugar.

*Example IX.*

1 kilogram sugar, 1 kilogram magnesium acetate and 1 kilogram sodium sulphite are dissolved in 8 litres water and mixed with 150 grams yeast. The fermentation will be finished after about 3-5 days, whereas the fermentation until the total decomposition of sugar will last longer than 4-5 days above the indicated time, if no magnesium acetate will be present. The output is: about 16% alcohol mixture, about 35% propantriol of the used sugar.

A further modification of the process is that one adds to the fermenting mixture, preferably at the stage in which the fermentation has reached its culmination and a large portion of the sugar has been fermented new portions of sugar, with or without further addition of salts or yeast or both added. By this modification it is possible to ferment higher amounts of sugar with a certain amount of yeast and salts (sulphites, phosphates etc.) than without the modification, whereas the duration of the fermentation will be somewhat shortened.

The additions of the alkaline and neutral salts may be the same as in the beginning of the fermentation, but one may also use different additions.

*Example X.*

750 grams sugar, 300 grams sodium sulphite, 5 grams magnesium sulphate, 6 grams ammonium sulphate, 2 grams potassium sulphate are dissolved in 6 litres water, mixed with 75 grams fresh press yeast and allowed to stand at about 30° to 35° centigrade. After 24 hours, when the fermentation has reached its culmination a solution of 750 grams sugar, 60 grams sodium sulphite, 1.5 grams ferrous sulphate, 3 grams ammonium sulphate, 1 gram potassium sulphate, in 1 litre water and 25 grams fresh press yeast are added. After the fermentation has finished the propantriol is isolated as in the Example I or in another known manner.

We claim:

1. The process for manufactureing propantriol which consists in adding alkaline sulphites (until alkaline reaction) and yeast to sugar and then allowing the mixture to be fermented.

2. The process for manufacturing propantriol which consists in adding alkaline sulphites (until alkaline reaction) and yeast to sugar causing the sugar to be fermented in presence of alkaline sulphites, separating the yeast and adding the separated yeast and alkaline reacting substances to sugar whereupon the process is repeated.

3. The process for manufacturing propantriol which consists in adding alkaline sulphites (until alkaline reaction) neutral salts of magnesium in a higher amount than necessary as yeast nutrients, and yeast to sugar and causing the sugar to be fermented.

4. The process for manufacturing propantriol which consists in adding alkaline sulphites (until alkaline reaction) and yeast to sugar, causing a portion of the sugar to be fermented, adding new portions of sugar and causing the sugar to be fermented.

5. The process of producing glycerol, which consists in fermenting a solution of fermentable sugar in an alkaline reacting medium.

In testimony whereof, we have signed our names to this specification in the presence of two subscribing witnesses.

Dr. KARL LÜDECKE.
WILHELM CONNSTEIN.

Witnesses:
Julius Franke,
Erna Wolff.